(12) United States Patent
Ohta et al.

(10) Patent No.: US 6,489,389 B1
(45) Date of Patent: *Dec. 3, 2002

(54) RUBBER COMPOSITION FOR TIRE TREADS

(75) Inventors: Toshiyuki Ohta, Tokyo (JP); Kenji Matsuo, Tokyo (JP); Jun Sakiyama, Tokyo (JP); Seiichiro Iwafune, Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,747

(22) Filed: Jan. 28, 1999

Related U.S. Application Data

(63) Continuation-in-part of application No. 08/749,828, filed on Nov. 15, 1996, which is a continuation of application No. 08/516,935, filed on Aug. 18, 1995.

(30) Foreign Application Priority Data

Aug. 19, 1994 (JP) .............................................. 6-195539
Aug. 19, 1994 (JP) .............................................. 6-195540

(51) Int. Cl.$^7$ .............................. C08L 3/20; C08L 3/22
(52) U.S. Cl. ........................ 524/437; 524/433; 524/495; 524/496; 524/430
(58) Field of Search ............................... 524/437, 443, 524/447, 496, 495

(56) References Cited

U.S. PATENT DOCUMENTS

| | | | | |
|---|---|---|---|---|
| 2,894,926 A | | 7/1959 | Jacobson et al. ............ 524/496 |
| 4,229,333 A | | 10/1980 | Wolff et al. .................. 524/262 |
| 4,522,970 A | | 6/1985 | Scriver et al. ............... 524/447 |
| 5,049,610 A | * | 9/1991 | Takaki et al. ................ 524/514 |
| 5,087,668 A | | 2/1992 | Sandstrom et al. ......... 525/236 |
| 5,160,409 A | | 11/1992 | Mroezrowski .............. 525/236 |
| 5,218,025 A | | 6/1993 | Kurimoto et al. ........... 524/260 |
| 5,336,730 A | | 8/1994 | Sandstrom et al. ......... 524/493 |
| 5,409,969 A | * | 4/1995 | Hamada ...................... 523/213 |
| 5,447,971 A | | 9/1995 | Bergh et al. ................. 524/262 |
| 5,451,454 A | * | 9/1995 | Fukahori et al. .......... 428/318.4 |
| 5,591,794 A | * | 1/1997 | Fukumoto et al. .......... 524/447 |
| 5,714,533 A | * | 2/1998 | Hatakeyama et al. ....... 524/140 |
| 5,834,536 A | * | 11/1998 | Scholl ......................... 523/211 |
| 6,025,415 A | * | 2/2000 | Scholl ......................... 523/213 |
| 6,093,756 A | * | 7/2000 | Scholl ......................... 523/216 |
| 6,130,283 A | * | 10/2000 | Nippa et al. ................. 524/437 |
| 6,242,522 B1 | * | 6/2001 | Ezawa et al. ................ 524/437 |
| 6,277,902 B1 | * | 8/2001 | Scholl ......................... 523/213 |
| 6,287,376 B1 | * | 9/2001 | Scholl et al. ................ 106/491 |
| 6,313,211 B1 | * | 11/2001 | Scholl ......................... 524/492 |
| 6,319,994 B2 | * | 11/2001 | Scholl et al. ............. 525/333.5 |

FOREIGN PATENT DOCUMENTS

| | | |
|---|---|---|
| DE | 4011983 | 10/1990 |
| EP | 0 807 603 A2 * | 11/1997 |
| EP | 0 890 605 A2 * | 1/1999 |
| GB | 674011 | 6/1952 |

OTHER PUBLICATIONS

Prof. Dr. Jürgen Falbe et al., "ROMPP Chemie Lexikon," pp. 2154–2156.

* cited by examiner

Primary Examiner—Edward J. Cain
Assistant Examiner—Katarzyna W. Lee
(74) Attorney, Agent, or Firm—Sughrue Mion, PLLC

(57) ABSTRACT

Rubber compositions for tire treads containing a rubber component containing at least 70 parts by weight of a styrene-butadiene rubber whose styrene content is 20 to 60%; 5 to 150 parts by weight of a powdery inorganic compound represented by formula (I) and having a particle size from 0.01 to 10 μm:

$$mM^1 \cdot xSiO_y \cdot zH_2O \qquad (I)$$

in which $M^1$ is at least one of Al, Mg, Ti, and Ca, or hydroxides or oxides thereof; and 5 to 170 parts by weight of carbon black having a nitrogen adsorption specific area of 80 to 280 m$^2$/g and the total amount of the powdery inorganic compound and the carbon black is from 70 to 200 parts by weight. The amount of an extract obtained when extracting the rubber composition, after being vulcanized, with acetone and chloroform should be 30 to 270 parts by weight. Similar compositions containing silica are also disclosed.

26 Claims, 1 Drawing Sheet

RUBBER COMPOSITION FOR TIRE TREADS

This is a Continuation-in-Part of application Ser. No. 08/749,828, filed Nov. 15, 1996, which is a continuation of application Ser. No. 08/516,935 filed Aug. 18, 1995.

BACKGROUND OF THE INVENTION

1. Field of the Invention

The present invention relates to rubber compositions for tire treads, and more particularly rubber compositions for tire treads which provide excellent braking performance and driving stability not only on general roads with pavement but also on wet road surfaces of motor race circuits.

2. Description of the Related Art

In recent years, as automobiles become capable of running at higher speeds, requirements imposed on their tire properties have become increasingly severe. Among such properties are performances of tires in operation at a high speed on a wet road surface. In order to improve tire properties including braking performance and driving stability on wet surfaces at high speeds, it is possible to take measures including enhancing the power for gripping the road surface, improving cornering characteristics by increasing the block rigidity of tire tread patterns and thereby resisting deformation at the time of cornering, and preventing a hydroplaning phenomenon by prohibiting deformation of grooves formed in tire treads so that water held in the grooves is discharged smoothly.

Conventionally, gripping power was enhanced by incorporating silica to high-styrene SBR, which has excellent mechanical characteristics.

Silica-containing rubber compositions for tire treads can improve gripping power in a low temperature range of 15° C. or less. However, they have the drawback that they cannot exhibit successful gripping power on wet road surfaces or on semi-wet (damp) road surfaces in a high temperature range of 15° C. or more, in which cooling effect by water is small.

In addition, if a great amount of silica is incorporated into a rubber composition, silica particles grind an oxide coating of the inner surface of a mixer during kneading, and then rubber components adhere to the flakes thus produced to reduce operating efficiency.

SUMMARY OF THE INVENTION

In view of the foregoing, an object of the present invention is to provide a rubber composition for tire treads which enhances gripping power on wet and semi-wet road surfaces which are not only in a low temperature range but also in a high temperature range, and which enhances operating efficiency during manufacture of the composition.

Accordingly, a first aspect of the present invention is a rubber composition for tire treads comprising a rubber component containing at least 70 parts by weight of a styrene-butadiene rubber whose styrene content is 20 to 60% (the unit of the styrene content is % by weight, in any sentences in the specification and claims); and Comprising, based on 100 parts by weight of the rubber component, 5 to 150 parts by weight of a powdery inorganic compound represented by the following formula (I) and having a particle size from 0.01 to 10 μm:

$$mM^1 \cdot xSiO_y \cdot zH_2O \qquad (I)$$

in which $M^1$ is at least one selected from the group consisting of Al, Mg, Ti, and Ca; any oxide of any one of the metals; or any hydroxide of any one of the metals; and m, x, y and z are integers from 1 to 5, 0 to 10, 2 to 5, and 0 to 10, respectively, and 5 to 170 parts by weight of carbon black having a nitrogen adsorption specific area of 80 to 280 m²/g so that the total amount of the powdery inorganic compound and the carbon black, falls in the range of 70 to 200 parts by weight, wherein the amount of an extract obtained by extracting the rubber composition after being vulcanized from acetone and chloroform is 30 to 270 parts by weight, based on 100 parts by weight of the rubber components.

A preferable embodiment of the first aspect of the present invention is a rubber composition for tire treads comprising a rubber component containing at least 70 parts by weight of a styrene-butadiene rubber whose styrene content is 30 to 45%; and comprising, based on 100 parts by weight of the rubber components, 15 to 120 parts by weight of a powdery inorganic compound represented by the following formula (I) and having a particle size from 0.05 to 5 μm:

$$mM^1 \cdot xSiO_y \cdot zH_2O \qquad (I)$$

in which $M^1$ is at least one selected from the group consisting of Al, Mg, Ti, and Ca; any oxide of any one of the metals; or any hydroxide of any one of the metals; and m, x, y, and z are integers from 1 to 5, 0 to 10, 2 to 5, and 0 to 10, respectively, and 15 to 140 parts by weight of carbon black having a nitrogen adsorption specific area of 80 to 280 m²/g so that the total amount of the powdery inorganic compound and the carbon black falls in the range of 70 to 180 parts by weight, and 5 to 40 parts by weight of at least one of a $C_9$ aromatic petroleum resin and an alkylphenol resin, wherein the amount of an extract obtained by extracting the rubber composition after being vulcanized from acetone and chloroform is 30 to 200 parts by weight, based on 100 parts by weight of the rubber component.

A second aspect of the present invention is a rubber composition for tire treads comprising a rubber component containing at least 70 parts by weight of a styrene-butadiene rubber whose styrene content is 20 to 60%; and comprising, based on 100 parts by weight of the rubber component, 5 to 150 parts by weight of a powdery inorganic compound represented by the following formula (I) and having a particle size from 0.01 to 10 μm:

$$mM^1 \cdot xSiO_y \cdot zH_2O \qquad (I)$$

in which $M^1$ is at least one selected from the group consisting of Al, Mg, Ti, and Ca; any oxide of any one of the metals; or any hydroxide of any one of the metals; and m, x, y, and z are integers from 1 to 5, 0 to 10, 2 to 5, and 0 to 10, respectively, 5 to 100 parts by weight of silica having a nitrogen adsorption specific area of 130 to 280 m²/g, and 5 to 170 parts by weight of carbon black having a nitrogen adsorption specific area of 80 to 280 m²/g so that the total amount of the powdery inorganic compound and the silica falls in the range of 80 to 250 parts by weight, wherein the amount of an extract obtained by extracting the rubber composition after being vulcanized from acetone and chloroform is 30 to 270 parts by weight, based on 100 parts by weight of the rubber component.

A preferable embodiment of the second aspect of the present invention is a rubber composition for tire treads comprising a rubber component containing at least 70 parts by weight of a styrene-butadiene rubber whose styrene content is 30 to 45%; and comprising, based on 100 parts by weight of the rubber component, 15 to 120 parts by weight of a powdery inorganic compound represented by the following formula (I) having a particle size from 0.05 to 5 µm:

$$mM^1\Psi xSiOy \cdot zH_2O \quad (I)$$

in which $M^1$ is at least one selected from the group consisting of Al, Mg, Ti, and Ca; any oxide of any one of the metals; or any hydroxide of any one of the metals; and m, x, y, and z are integers from 1 to 5, 0 to 10, 2 to 5, and 0 to 10, respectively, 30 to 100 parts by weight of silica having a nitrogen adsorption specific area of 130 to 280 m²/g, 15 to 140 parts by weight of carbon black having a nitrogen adsorption specific area of 80 to 280 m²/g so that the total amount of the powdery inorganic compound and the silica falls in the range of 100 to 230 parts by weight, 5 to 40 parts by weight of at least one of a $C_9$ aromatic petroleum resin and an alkylphenol resin, and, based on the amount by weight of the silica, 3 to 20 percents by weight of a silane coupling agent, wherein the amount of an extract obtained by extracting the rubber composition after being vulcanized from acetone and chloroform is 30 to 200 parts by weight, based on 100 parts by weight of the rubber component.

The above and other objects, features, and advantages of the present invention will become apparent from the following description.

DESCRIPTION OF THE PREFERRED EMBODIMENTS

Figure 1:
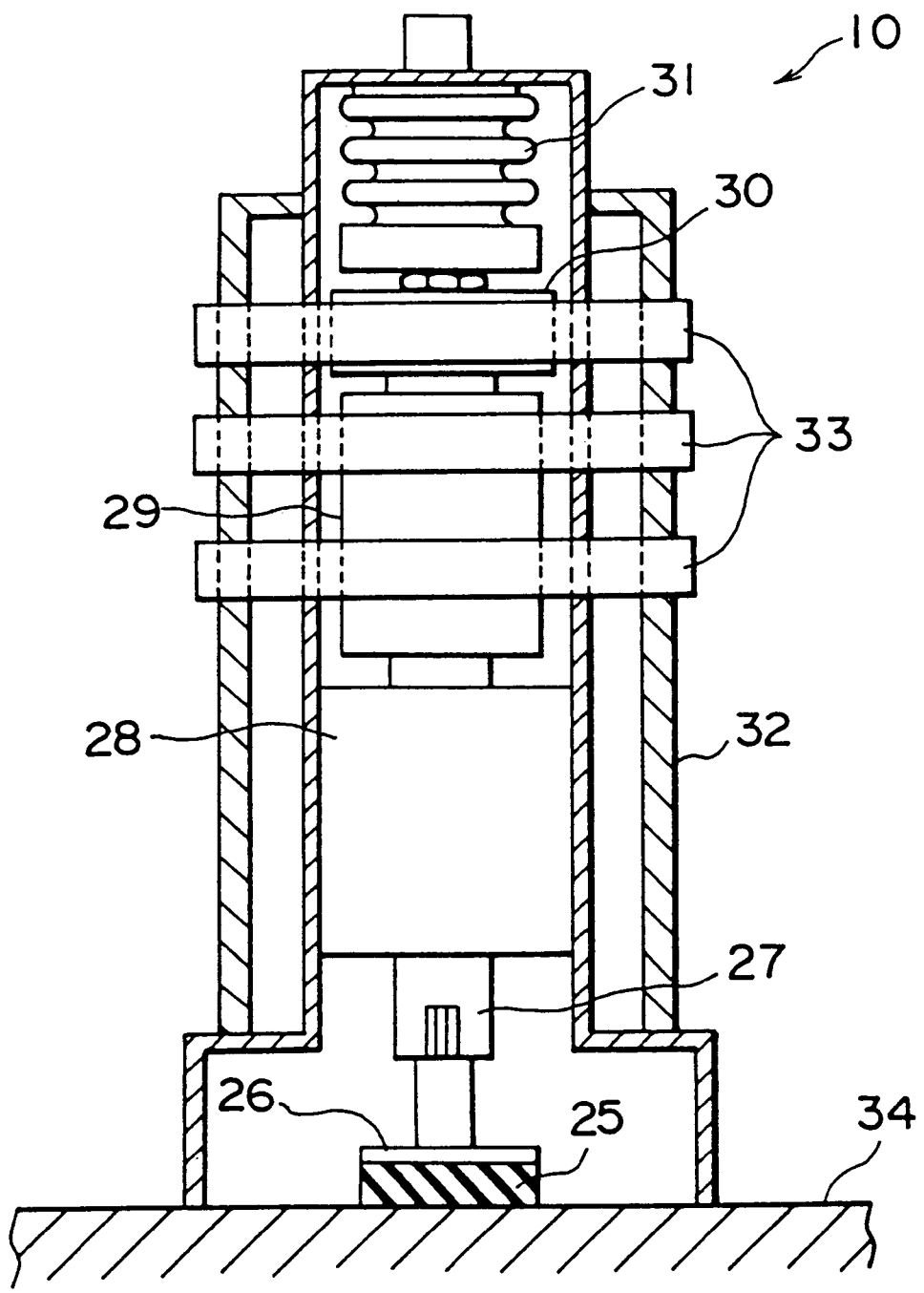
FIG. 1 is a sectional view showing a main portion of a road surface friction tester used in the road surface friction test in the present invention.

The present invention will next be described in detail. The description will start with the first aspect of the present invention.

The rubber component which is used in the present invention comprises a styrene-butadiene rubber having a styrene content of 20 to 60%. If the styrene content is less than 20%, desired gripping power cannot be obtained in the above-mentioned low temperature range nor high temperature range. If the styrene content is in excess of 60%, block rigidity becomes unnecessarily high to reduce the amount of bite of the rubber into a road surface, and desired gripping power cannot be obtained. In order to obtain significant advantages, it is preferred that the styrene content be from 30 to 45%. The styrene-butadiene rubber can be prepared by any synthesis method such as emulsion polymerization or solution polymerization.

The rubber component which is used in the present invention may include other rubber components in addition to the above-mentioned styrene-butadiene rubber. Examples of such other rubber components include, but are not limited to, cis-1,4-polyisoprene, low cis-1,4-polybutadiene, high cis-1,4-polybutadiene, ethylene-propylene-diene rubbers, chloroprene, halogenated butyl rubbers, acrylonitrile-butadiene rubbers, and natural rubbers. Styrene-butadiene rubbers with a styrene content falling outside the range described above may be used as the "other rubber component(s)". One or more species of the "other rubber component(s)" may be included in the rubber components used in the present invention.

A styrene-butadiene rubber containing styrene in an amount within the above-described range is present in an amount of not less than 70 parts by weight per 100 parts by weight of the overall rubber components used in the present invention. If the amount of styrene-butadiene rubber is less than 70 parts by weight, desired gripping power cannot be obtained both in low and high temperature ranges.

The rubber composition for tire treads of the present invention comprises a powdery inorganic compound represented by the following formula (I):

$$mM^1 \cdot xSiOy \cdot zH_2O \quad (I)$$

in which $M^1$ is at least one metal selected from the group consisting of Al, Mg, Ti, and Ca; any oxide of any one of the metals; or any hydroxide of any one of the metals; and m, x, Y, and z are integers from 1 to 5, 0 to 10, 2 to 5, and 0 to 10, respectively.

In formula (I), when x and z are both 0, the inorganic compound is at least one selected from the group consisting of Al, Mg, Ti, and Ca; metal oxides thereof, or metal hydroxides thereof.

Examples of the inorganic compounds of formula (I) include alumina ($Al_2O_3$), aluminum hydroxide ($Al(OH)_3$), magnesium hydroxide ($Mg(OH)_2$), magnesium oxide ($MgO_2$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide ($Ca(OH)_2$), magnesium aluminum oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate (for example, $Al_2SiO_5$, $Al_4 \cdot 3SiO_4 \cdot 5H_2O$), magnesium silicate (for example, $Mg2 \cdot SiO_4$, $MgSiO_3$), calcium silicate ($Ca_2 \cdot SiO_4$), calcium aluminum silicate (for example, $Al_2O_3 \cdot CaO \cdot 2SiO_2$), and calcium magnesium silicate ($CaMgSiO_4$).

The above-mentioned aluminum hydroxide includes alumina hydrates ($Al_2O_3 \cdot 3H_2O$).

These inorganic compounds represented by formula (I) may be used singly or in combination of two or more. Among them, aluminum hydroxide is particularly preferred in view of its advantage of prominently enhancing the gripping power.

The above-described inorganic compounds must be in the form of a powder with a particle size of 0.01–10 µm. If the inorganic compounds have a particle size of less than 0.01 µm, operating efficiency in kneading goes down while enhanced gripping power is not expected. A particle size in excess of 10 µm is not preferable, either, since the modulus of elasticity greatly decreases and in addition sufficient gripping power is not obtained even at the sacrifice of abrasion resistance. In order to obtain advantageous effects at a high and well-balanced level, the particle size is preferably from 0.05 to 5 µm and more preferably from 0.1 to 3 µm.

The rubber composition for tire treads according to the present invention contains carbon black with a nitrogen adsorption specific area ($N_2SA$) of 80 to 280 m²/g. A nitrogen adsorption specific area of less than 80 m²/g is not preferable because a successful modulus of elasticity and sufficient gripping power cannot be obtained, and in addition, abrasion resistance becomes poor. A nitrogen adsorption specific area in excess of 280 m²/g is not preferable, either, because operating efficiency in kneading decreases.

Examples of the carbon black which can be used in the present invention include N330, N220, and N110 (according to the designation of ASTM, which are otherwise abbreviated as HAF, ISAF, and SAF in Japan). Among them, N110 is preferable from the viewpoint of enhancing gripping power on a wet road surface in a low temperature range, and on a wet or semi-wet road surface in a high temperature range.

The amounts of the above-mentioned powdery inorganic compounds and carbon blacks are 5–150 parts by weight and 5–170 parts by weight, respectively, per 100 parts by weight of the overall rubber components. In addition, the total amount of the inorganic powders and carbon black is from 70 to 200 parts by weight with respect to 100 parts by weight of the overall rubber components. If the amount of the inorganic powders is less than 5 parts by weight, sufficient gripping power cannot be obtained, which is undesirable. Also, it is not preferable that the amount of inorganic powders be in excess of 150 parts by weight, because sufficient gripping powder is not obtained at the sacrifice of abrasion resistance. If the amount of the carbon black is less than 5 parts by weight, sufficient gripping power is not obtained even at the sacrifice of abrasion resistance, whereas if it is in excess of 170 parts by weight, operating efficiency in kneading drops, which is undesirable. If the total amount of the inorganic powders and carbon black is less than 70 parts by weight, sufficient gripping power is not obtained, whereas if the total amount is in excess of 200 parts by weight, operating efficiency in kneading drops. In order to greatly effect the advantages, the amounts of the inorganic compounds and the carbon blacks are preferably 15–120 parts by weight and 15–140 parts by weight, respectively, and the total amount of the inorganic compounds and carbon black is preferably 70–180 parts by weight.

The rubber composition for tire treads according to the present invention may contain one or more of $C_9$ aromatic petroleum resins and alkylphenol resins. In this description, the term "$C_9$ aromatic petroleum resins" refers to polymers of $C_9$ aromatic monomers. Examples of the $C_9$ aromatic monomers include vinyl toluenes, $\alpha$-methylstyrenes, coumarones, and indenes. The $C_9$ aromatic monomers may be used singly or in combination of two or more. Examples of the alkylphenol resins include alkylphenol-acetylene resins such as p-t-butylphenol-acetylene and alkylphenolformaldehyde resins such as cresols, xylenols, p-t-butylphenols, and p-t-octylphenols. The softening point of these resins is preferably from 60 to 150° C. A softening point of lower than 60° C. does not yield sufficient gripping power on a wet road surface nor on a semi wet road surface, in a high-temperature range. On the other hand, if the softening point is in excess of 150° C., the resins are not uniformly dispersed when they undergo kneading. Also, operating efficiency in kneading decreases, and abrasion resistance significantly decreases. These $C_9$ aromatic petroleum resins and alkylphenol resins may be used singly. Alternatively, two or more species of them may be used together. Furthermore, the $C_9$ aromatic petroleum resins and alkylphenol resins may be used in combination at the same time. Preferred examples of the $C_9$ aromatic petroleum resins include Neopolymer 80 (trademark, product of Nippon Petrochemical Co., Ltd., softening point=83° C.) and Neopolymer 140 (trademark, product of Nippon Petrochemical Co., Ltd., softening point= 145° C.). Preferred examples of the alkylphenol resins include Phenolite AA1101 (trademark, product of Dainippon Ink and Chemicals, Inc., softening point=94° C.).

The amount of the resin is from 3 to 50 parts by weight with respect to 100 parts by weight of the above-mentioned overall rubber components. If the amount of the resin is less than 3 parts by weight, desired gripping power cannot be obtained, whereas if the amount is in excess of 50 parts by weight, operating efficiency in kneading significantly goes down. In order to obtain excellently advantageous effects, the amount of the resin is preferably 5–40 parts by weight.

In the present invention, the amount of an extract obtained by extracting the rubber composition from acetone and chloroform after being vulcanized must be from 30 to 270 parts by weight with respect to 100 parts by weight of the overall rubber component. It is not preferable that the amount of extract be less than 30 parts by weight or in excess of 270 parts by weight, because, in both cases, operating efficiency in kneading decreases while neither enhanced gripping force or improvement in abrasion resistance can be expected. In order to obtain gripping force, abrasion resistance, and operating efficiency in kneading at a high and well-balanced level, it is preferred that the amount of the extract be from 30 to 200 parts by weight.

In the rubber composition for tire treads according to the present invention, various additives ordinarily used in the rubber industry may be incorporated in addition to the components described above. Such optional components include vulcanizing agents such as sulfur, various vulcanization-accelerators, various softeners, various anti-aging agents, zinc oxide, stearic acid, aromatic oils, antioxidants, and ozone degradation inhibitors.

The second aspect of the present invention will next be described. Since many features are common to both the first aspect and the second aspect of the invention, the following description will focus only on features which are different from the first aspect.

It is noteworthy that the rubber composition for tire treads according to the second aspect of the present invention contains silica having a nitrogen adsorption specific area ($N_2SA$) of 130 to 280 $m^2/g$. It is not preferable that the nitrogen adsorption specific area of silica be less than 130 $m^2/g$, because sufficient modulus in elasticity cannot be obtained. A nitrogen adsorption specific area in excess of 280 $m^2/g$ is not preferable, either, because operating efficiency in kneading-decreases while enhanced gripping power Is not expected.

The type of silica which is used in the second aspect of the present invention is not particularly limited. For example, silica manufactured by a dry process (silicic acid anhydride) and silica manufactured by a wet process (silicic acid hydrate) can be used, of which silica manufactured by a wet process is preferred. Preferred examples of the silica manufactured by a wet process include Nipseal VN3 AQ (trademark, manufactured by Nippon Silica Co.).

The amounts of the powdery inorganic compounds, silica, and carbon black are 5–150 parts by weight, 5–100 parts by weight, and 5–170 parts, respectively, based on 100 parts by weight of the aforementioned overall rubber components. In addition, the total amount of the three is 80–250 parts by weight based on 100 parts by weight of the overall rubber components. If the amount of the powdery inorganic compound is less than 5 parts by weight, sufficient gripping power cannot be obtained, which is undesirable. Also, it is not preferable that the amount of inorganic powders be in excess of 150 parts by weight, because the modulus in elasticity greatly decreases and abrasion resistance becomes poor. if the amount of the silica is less than 5 parts by weight, gripping power on a wet road surface is insufficient, whereas an amount in excess of 100 parts by weight will result in greatly decreased operating efficiency in kneading and no improvement in abrasion resistance. If the amount of the carbon black is less than 5 parts by weight, sufficient reinforcing property is not obtained and abrasion resistance is reduced, whereas if it is in excess of 170 parts by weight, operating efficiency in kneading drops while enhanced gripping power and improvement in abrasion resistance are not expected. Moreover, if the total amount of the powdery inorganic compounds, silica, and carbon black is less than 80 parts by weight, sufficient gripping power and abrasion resistance cannot be obtained, whereas if the total amount is in excess of 250 parts by weight, operating efficiency in kneading drops while enhanced abrasion resistance cannot be expected. In order to obtain sufficiently advantageous effects, the amounts of the powdery inorganic compounds, silica, and the carbon black are preferably 15–120 parts by weight, 30–100 parts by weight, and 15–140 parts by weight, respectively, and the total amount of them is preferably 100–230 parts by weight.

The rubber composition for tire treads according to the second aspect of the present invention may contain 3–20% by weight of a silane coupling agent. Silane coupling agents have an action of intensifying the linkage of silica and rubber components to improve abrasion resistance. It is not preferable that the amount of the silane coupling agents be less than 3% by weight or in excess of 20% by weight based on the amount of the silica, since noticeable effect of the silane coupling agents is not obtained in the former case, and the effect of the coupling agents is not commensurate to the increase in costs in the latter case.

The silane coupling agents which are suitably used in the second aspect of the present invention are represented by the formula $Y_3$—Si—$C_nH_{2n}$A, wherein Y is $C_1$–$C_4$ alkyl, alkoxy, or a chlorine atom and three Y's may be the same or different from each other, n is an integer from 1 to 6 inclusive, A is —$S_mC_nH_{2n}$Si—$Y_3$, nitroso, mercapto, amino, epoxy, vinyl, a chlorine atom, imido, and —$S_mZ$ (wherein m is an integer from 1 to 6 inclusive, n and Y are as defined hereinabove, and Z is a group selected from the group consisting of the compounds (A), (B), and (C):

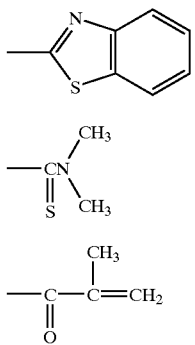

Specific examples of the silane coupling agents which are used in the second aspect of the present invention include bis(3-triethoxysilylpropyl)tetrasulfide, bis(2-triethoxysilylethyl)tetrasulfide, bis(3-trimethoxysilylpropyl) tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-nitropropyl trimethoxysilane, 3nitropropyl triethoxysilane, 3-chloropropyl trimethoxysilane, 3-chloropropyl triethoxysilane, 2-chloroethyl trimethoxysilane, 2-chloroethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, and 3-trimethoxysilylpropylmethacrylate monosulfide. In order to achieve a balance between the advantageous effect of coupling agents and economy, bis(3-triethoxysilylpropyl)tetrasulfide, 3-trimethoxysilylpropylbenzothiazole tetrasulfide and the like are preferred. Examples of the silane coupling agents in which three Y's are not the same include bis(3-diethoxymethylsilylpropyl)tetrasulfide, 3-mercaptopropyl dimethoxymethylsilane, 3-nitropropyl dimethoxymethylsilane, 3-chloropropyl dimethoxymethylsilane, dimethoxymethylsilylpropyl-N,N-dimethylthiocarbamoyl tetrasulfide, and dimethoxymethylsilylpropylbenzothiazole tetrasulfide.

EXAMPLES

The present invention will next be described in more detail by way of examples, which should not be construed as limiting the invention.

Examples 1A to 7A (Related to the First Aspect of the Invention) and Comparative Examples 1A to 3A The components (amounts expressed as parts by weight) shown in Tables I and 2 were kneaded in a Bunbary mixer to prepare various rubber compositions for tire treads.

The obtained rubber compositions for tire treads were vulcanized at 145° C. for 45 minutes, after which they were subjected to a variety of measurements described below.

The styrene content in the styrene-butadiene rubber was determined from the calibration curve of an infrared method based on the absorption of phenyl groups at 699 $cm^{-1}$.

Extraction from acetone and chloroform was performed in accordance with JIS K 6350.

A road surface friction test was performed using a road surface friction tester described in JP-U-5-66545. As shown in FIG. 1, the road surface friction tester 10 is housed in an unillustrated casing which is placed on a road surface 34 formed, for example, of asphalt. The tester is equipped with a frame 32. To the top of the frame 32 is fixed a bellows 31 which is connected to an air source unit (not shown) through an unillustrated air tube. Immediately below the bellows 31, a load cell 30 and a motor 29 are disposed. The load cell 30 detects downward loads applied by the bellows 31 due to the air pressure supplied by the air source unit. The load cell 30 and motor 29 are securely fixed by guide frames 33 so as not to deviate from a position directly beneath the bellows 31, thereby preventing the data from varying widely. Directly under the motor 29 is disposed a rotation axis 27. The rotation axis 27 and the output shaft of the motor 29 are linked to rotate the rotation axis 27 by the driving force of motor 29. Under the rotation axis 27, a socket 26, together with the road surface 34, for sandwiching a disk-shaped or cylindrical rubber sample 25 is connected. Thus, by the cooperation of the load cell 30, motor 29, and rotation axis 27, the downward load applied by the bellows 31 is transmitted to the rubber sample 25. Simultaneously, the rubber sample 25 is rotated on the road surface 34 as the rotation axis 27 rotates. In the vicinity of the rotation axis 27, a torque meter 28 is disposed to detect the torque generated by the rotation of the rubber sample 25.

The torque meter 28 and load cell 30 are electrically connected to a mensuration controlling trunk which is not shown so that the detected torque and loads are transmitted to the trunk. The mensuration controlling trunk is equipped with a control panel which displays the frictional force between the road surface 32 and rubber sample 25 calculated from the transmitted torque as well as the transmitted load data. The mensuration controlling trunk is also electrically connected to the aforementioned air source unit to control the load applied to the rubber sample 25 by regulating the air pressure supplied from the air source unit to the bellows 31 based on the load data transmitted from the load cell 30. The air source unit and the mensuration control trunk are electrically connected to an unillustrated generator.

The road surface friction test was performed using the above-described road surface friction tester under a load of 8 kgf and at a rotation speed of 20 rpm. The data obtained in the test (labo $\mu$) were exponentially expressed based on the value of Comparative Example 1 (=100).

The values at 5° C. and 20° C. are indices representing friction coefficients on a wet road surface in a low temperature range and, on a wet road surface or a semi-wet road surface in a high temperature range, respectively. The greater these values are, the more excellent the gripping power is evaluated.

The operational efficiency was evaluated by ranking the amounts of the rubber composition for tire treads adhered to the inner wall of the aforementioned mixer in 5 grades based on the total amount of the rubber composition charged in the mixer (5: almost no adhesion, 4: within 3%, 3: within 5%, 2: within 10%, 1: in excess of 10%). The greater the value, the better the operational efficiency is evaluated.

The results are shown in Tables 1 and 2.

TABLE 1

|  | Comp. Ex. 1A | Comp. Ex. 2A | Comp. Ex. 3A | Ex. 1A | Ex. 2A | Ex. 3A |
|---|---|---|---|---|---|---|
| SBR*1 | 100 | 100 | 100 | 100 | 100 | 100 |
| Carbon black*2 | 110 | 80 | 20 | 110 | 80 | 20 |
| Silica*3 | 20 | 50 | 110 | 0 | 0 | 0 |
| Aluminum hydroxide*4 | 0 | 0 | 0 | 20 | 50 | 110 |
| Clay*5 | 0 | 0 | 0 | 0 | 0 | 0 |
| Total amount | 130 | 130 | 130 | 130 | 130 | 130 |
| Silane coupling agent*6 | 2 | 5 | 11 | 0 | 0 | 0 |
| Acetone.Chloroform extract | 136 | 148 | 188 | 127 | 118 | 107 |
| Aromatic oil | 130 | 140 | 180 | 120 | 110 | 100 |
| Resin A *7 | 0 | 0 | 0 | 0 | 0 | 0 |
| Resin B *8 | 0 | 0 | 0 | 0 | 0 | 0 |
| Resin C *9 | 0 | 0 | 0 | 0 | 0 | 0 |
| Vulcanization-accelerator (CZ)*10 | 1.9 | 1.9 | 1.9 | 1.9 | 1.9 | 1.9 |
| Vulcanization-accelerator (TOT)*11 | 1.0 | 1.0 | 1.0 | 1.0 | 1.0 | 1.0 |
| Sulfur | 1.5 | 1.5 | 1.5 | 1.5 | 1.5 | 1.5 |
| Labo $\mu$ index (5° C.) | 100 | 108 | 118 | 110 | 120 | 129 |
| Labo $\mu$ index (20° C.) | 100 | 104 | 108 | 108 | 111 | 115 |
| Index of operational efficiency | 3 | 2 | 1 | 5 | 5 | 4 |

TABLE 2

|  | Ex. 4A | Ex. 5A | Ex. 6A | Ex. 7A |
|---|---|---|---|---|
| SBR*1 | 100 | 100 | 100 | 100 |
| Carbon black*2 | 110 | 110 | 110 | 110 |
| Silica*3 | 0 | 0 | 0 | 0 |
| Aluminum hydroxide*4 | 0 | 20 | 20 | 20 |
| Clay*5 | 20 | 0 | 0 | 0 |
| Total amount | 130 | 130 | 130 | 130 |
| Silane coupling agent*6 | 0 | 0 | 0 | 0 |
| Acetone.Chloroform extract | 127 | 126 | 126 | 125 |
| Aromatic oil | 120 | 90 | 90 | 90 |
| Resin A *7 | 0 | 30 | 0 | 0 |
| Resin B *8 | 0 | 0 | 30 | 0 |
| Resin C *9 | 0 | 0 | 0 | 30 |
| Vulcanization-accelerator (CZ)*10 | 1.9 | 1.9 | 1.9 | 1.9 |
| Vulcanization-accelerator (TOT)*11 | 1.0 | 1.0 | 1.0 | 1.0 |
| Sulfur | 1.5 | 1.5 | 1.5 | 1.5 |
| Labo $\mu$ index (5° C.) | 105 | 112 | 109 | 113 |
| Labo $\mu$ index (20° C.) | 104 | 111 | 113 | 117 |
| Index of operational efficiency | 5 | 4 | 5 | 4 |

Note
Ex: Example
Comp. Ex.: Comparative Example
*1: 0120 (trademark), product of Japan Synthetic Rubber Co., Ltd. (styrene content: 35%)
*2: SAF ($N_2SA$ 150 $m^2/g$)
*3: Nipseal VN 3 AQ (trademark, product of Nippon Silica Co.)
*4 Highdilite H-43M (trademark, product of Showa Denko Co., average particle size: 0.6 $\mu$m)
*5 NUCAP 290 (trademark, product of J. M. Huber Co., average particle size: 0.2 $\mu$m)
*6 Si-69 (trademark, product of Degussa Co.)
*7 $C_9$ aromatic petroleum resin, Neopolymer 80 (trademark, product of Nippon Petrochemical Co., Ltd., softening point: 83° C.)

*8 $C_9$ aromatic petroleum resin, Neopolymer 140 (trademark, product of Nippon Petrochemical Co., Ltd., softening point: 145° C.)

*9 Alkylphenol resin, Phenolite AA1101 (trademark, product of Dainippon Ink and Chemicals, Inc., softening point: 94° C.)

*10 Noxella CZ-G (trademark, product of Ohuchi Synko Chemical Industry Co., N-cyclohexyl-2-benzothiazyl-1-sulfenamide)

*11: Noxella TOT-N (trademark, product of Ohuchi Synko Chemical Industry Co., tetrakis-2-ethylhexylthiuram disulfide)

When the results of Example 1A and Comparative Example 1A, those of Example 2A and Comparative Example 2A, and those of Example 3A and Comparative Example 3A are compared in pairs, it is understood that the data obtained in Examples 1A, 2A, and 3A, where the amount of carbon black and that of silica or the powdery inorganic compound(aluminum hydroxide) were the same as those used in the corresponding Comparative Examples but aluminum oxide was used instead of silica, are superior to Comparative Examples with respect to the labo $\mu$ values at 5° C. (low temperature range) and 20° C. (high temperature range) and the operational efficiency.

It is also noteworthy that when the results of Example 4A in which clay was employed as the powdery inorganic compound are compared with those of Comparative Example 1A, in which the amount of carbon black and that of silica or the powdery inorganic compound were the same as those used in Example 4A, Improved labo $\mu$ values at 5° C. (low temperature range) and 20° C. (high temperature range) and improved operational efficiency were obtained in Example 4A. Moreover, comparison between Example 1A and Example 4A, where the amount of carbon black and that of the powdery inorganic compound employed were common, revealed that Example 1A (in which aluminum hydroxide was employed as the powdery inorganic compound) exhibited a greater improvement in the labo $\mu$ values at 5° C. flow temperature range) and 20° C. (high temperature range).

The samples of Examples 5A and 6A contained a $C_9$ aromatic petroleum resin. When the results of these examples are compared with those of Comparative Example 1A, in which the amount of carbon black and that of silica or the powdery inorganic compound are common, it is understood that the labo $\mu$ values at 5° C. flow temperature range) and 20° C. (high temperature range) and operational efficiency were improved. Furthermore, when the results of Examples 1A, 5A, and 6A are compared to each over, it is understood that Examples 5A and 6A, in which a $C_9$ aromatic petroleum resin was used, exhibited a greater enhancement in the labo $\mu$ value at 20° C. (high temperature range).

The sample of Example 7A contained an alkylphenol resin. When the results of this example are compared with those of Comparative Example 1A, in which the amount of carbon black and that of silica or the powdery inorganic compound were common, it is understood that the labo $\mu$ values at 5° C. (low temperature range) and 20° C. (high temperature range) and operational efficiency were improved. Especially, the labo $\mu$ value at 20° C. (high temperature range) was remarkably improved.

Examples 1B to 9B (Related to the Second Aspect of the Invention) and Comparative Example 1B The components (amounts expressed as parts by weight) shown in Tables 3 and 4 were kneaded to prepare various rubber compositions for tire treads. Also, a road surface friction test was conducted in the same manner as that described hereinbefore.

Concerning abrasion resistance, a test was performed using a Ranbone-type friction tester at room temperature and at a slip ratio of 25%, and the results were exponentially expressed based on the value obtained in Comparative Example 1B. The greater the abrasion resistance index is, the better the abrasion resistance is evaluated.

The results are shown in Tables 3 and 4.

TABLE 3

|  | Comp. Ex. 1B | Ex. 1B | Ex. 2B | Ex. 3B | Ex. 4B |
|---|---|---|---|---|---|
| SBR*1 | 100 | 100 | 100 | 100 | 100 |
| Carbon black*2 | 80 | 80 | 80 | 80 | 80 |
| Silica*3 | 70 | 50 | 50 | 50 | 50 |
| Aluminum hydroxide*4 | 0 | 20 | 60 | 100 | 0 |
| Clay*5 | 0 | 0 | 0 | 0 | 20 |
| Total amount | 150 | 150 | 190 | 230 | 150 |
| Silane coupling agent*6 | 7 | 5 | 5 | 5 | 5 |
| Acetone.Chloroform extract | 178 | 128 | 147 | 168 | 127 |
| Aromatic oil | 170 | 120 | 140 | 160 | 120 |
| Resin A *7 | 0 | 0 | 0 | 0 | 0 |
| Resin B *8 | 0 | 0 | 0 | 0 | 0 |
| Resin C *9 | 0 | 0 | 0 | 0 |  |
| Vulcanization-accelerator (CZ)*10 | 1.9 | 1.9 | 1.9 | 1.9 | 1.9 |
| Vulcanization-accelerator (TOT)*11 | 1.0 | 1.0 | 1.0 | 1.0 | 1.0 |
| Sulfur | 1.5 | 1.5 | 1.5 | 1.5 | 1.5 |
| Labo $\mu$ index (5° C.) | 100 | 109 | 113 | 118 | 104 |
| Labo $\mu$ index (20° C.) | 100 | 108 | 111 | 114 | 104 |
| Abrasion resistance | 100 | 105 | 104 | 103 | 103 |

TABLE 4

|  | Ex. 5B | Ex. 6B | Ex. 7B | Ex. 8B | Ex. 9B |
|---|---|---|---|---|---|
| SBR*1 | 100 | 100 | 100 | 100 | 100 |
| Carbon black*2 | 80 | 80 | 80 | 80 | 80 |
| Silica*3 | 50 | 50 | 50 | 50 | 50 |
| Aluminum hydroxide*4 | 20 | 20 | 20 | 20 | 20 |
| Clay*5 | 0 | 0 | 0 | 0 | 0 |
| Total amount | 150 | 150 | 150 | 150 | 150 |
| Silane coupling agent*6 | 5 | 5 | 5 | 0 | 0 |
| Acetone.Chloroform extract | 126 | 126 | 125 | 127 | 126 |
| Aromatic oil | 90 | 90 | 90 | 120 | 90 |
| Resin A *7 | 30 | 0 | 0 | 0 | 0 |
| Resin B *8 | 0 | 30 | 0 | 0 | 30 |
| Resin C *9 | 0 | 0 | 30 | 0 | 0 |
| Vulcanization-accelerator (CZ)*10 | 1.9 | 1.9 | 1.9 | 1.9 | 1.9 |
| Vulcanization-accelerator (TOT)*11 | 1.0 | 1.0 | 1.0 | 1.0 | 1.0 |
| Sulfur | 1.5 | 1.5 | 1.5 | 1.5 | 1.5 |
| Labo $\mu$ index (5° C.) | 111 | 108 | 112 | 110 | 109 |
| Labo $\mu$ index (20° C.) | 111 | 113 | 117 | 106 | 111 |
| Abrasion resistance | 104 | 107 | 104 | 100 | 112 |

Note
*1 to *11: See the notes under Table 2.

In addition, two sets of comparative examples to compare a metal hydroxide (aluminum hydroxide) with oxides of the same and of other metals were carried out, in order to prove the excellent and previously unknown effect of this particular metal hydroxide for a rubber composition, compared with the oxides of the same and of other metals. Though the particular effect of the claimed metal hydroxides was demonstrated only for aluminum hydroxide in these experiments, deducing from the closely interchangeable behavior of aluminum hydroxide and the claimed metal hydroxides, excellent results of the same level as Al(OH)$_3$ should also be obtainable in the case of the other claimed metal hydroxides.

Table 5 and Table 6 show the results of the aforementioned sets of comparative examples. Table 5 shows the results of the four comparative examples Comp. Exs. 11–14, which were conducted under exactly the same conditions as Ex. 1A in Table 1, only differing in that different metal oxides or similar compounds, rather than metal hydroxides, were employed. Table 6 shows the results of the other four comparative examples, Comp. Exs. 21–24, which were conducted under exactly the same conditions as Ex. 1B in Table 3, only differing in that the compounds used in Comp. Exs. 11–14 were employed.

The excellent results of Table 1 and Table 3 can be clearly understood by comparing them with the results of Table 5 and Table 6, respectively.

For example, the results exhibited in Ex. 1A of Table 1 (the LABO $\mu$ indexes, in particular) are greatly superior to that of Table 5. Also, the results exhibited in Ex. 1B of Table 3 (both the LABO $\mu$ indexes and Abrasion resistance) are greatly superior to that of Table 6.

The reason why aluminum hydroxide (and the other claimed metal hydroxides, in all likelihood) brings about such a superb result is not known at the present time. However, it is postulated that some unknown influence of the OH group contained in the compound may exist.

TABLE 5

|  | Comp. Ex. 11 | Comp. Ex. 12 | Comp. Ex. 13 | Comp. Ex. 14 |
| --- | --- | --- | --- | --- |
| SBR*1 | 100 | 100 | 100 | 100 |
| CARBON BLACK *2 | 110 | 110 | 110 | 110 |
| CLAY *3 | 20 | 0 | 0 | 0 |
| CALCIUM SILICATE *4 | 0 | 20 | 0 | 0 |
| MAGNESIUM SILICATE *5 | 0 | 0 | 20 | 0 |
| ALUMINUM OXIDE *6 | 0 | 0 | 0 | 20 |
| TOTAL AMOUNT | 130 | 130 | 130 | 130 |
| ACETONE CHLOROFORM EXTRACT | 127 | 127 | 127 | 127 |
| AROMATIC OIL | 120 | 120 | 120 | 120 |
| CZ *7 | 1.9 | 1.9 | 1.9 | 1.9 |
| TOT *8 | 1.0 | 1.0 | 1.0 | 1.0 |
| SULFUR | 1.5 | 1.5 | 1.5 | 1.5 |
| LABO $\mu$ INDEX (5° C.) | 105 | 103 | 101 | 104 |
| LABO $\mu$ INDEX (20° C.) | 104 | 102 | 100 | 103 |
| INDEX OF OPERATIONAL EFFICIENCY | 5 | 4 | 4 | 4 |

TABLE 6

|  | Comp. Ex. 21 | Comp. Ex. 22 | Comp. Ex. 23 | Comp. Ex. 24 |
| --- | --- | --- | --- | --- |
| SBR *1 | 100 | 100 | 100 | 100 |
| CARBON BLACK *2 | 80 | 80 | 80 | 80 |
| SILICA *9 | 50 | 50 | 50 | 50 |
| CLAY *3 | 20 | 0 | 0 | 0 |
| CALCIUM SILICATE *4 | 0 | 20 | 0 | 0 |
| MAGNESIUM SILICATE *5 | 0 | 0 | 20 | 0 |
| ALUMINUM OXIDE *6 | 0 | 0 | 0 | 20 |
| TOTAL AMOUNT | 150 | 150 | 150 | 150 |
| SILANE COUPLING AGENT *10 | 5 | 5 | 5 | 5 |
| ACETONE CHLOROFORM EXTRACT | 127 | 127 | 127 | 127 |
| AROMATIC OIL | 120 | 120 | 120 | 120 |
| CZ *7 | 1.9 | 1.9 | 1.9 | 1.9 |
| TOT *8 | 1.0 | 1.0 | 1.0 | 1.0 |
| SULFUR | 1.5 | 1.5 | 1.5 | 1.5 |

TABLE 6-continued

|  | Comp. Ex. 21 | Comp. Ex. 22 | Comp. Ex. 23 | Comp. Ex. 24 |
|---|---|---|---|---|
| LABO μ INDEX (5° C.) | 104 | 102 | 101 | 103 |
| LABO μ INDEX (20° C.) | 104 | 102 | 100 | 102 |
| ABRASION RESISTANCE | 103 | 100 | 98 | 101 |

Notes
Ex: Example
Comp. Ex.: Comparative Example
*1: 0120 (trademark), product of Japan Synthetic Rubber Co., Ltd. (styrene content: 35%)
*2: SAF ($N_2SA$ 150 m²/g)
*3: $Al_2O_3 \cdot 2SiO_2 \cdot 2H_2O$
*4: $CaSiO_3$
*5: $MgSiO_2$
*6: $Al_2O_3$
*7: Noxella CZ-G (trademark, product of Ohuchi Synko Chemical Industry Co., N-cyclohexyl-2-benzothiazyl-1-sulfenamide)
*8: Noxella TOT-N (trademark, product of Ohuchi Synko Chemical Industry Co., tetrakis-2-ethylhexylthiuram disulfide)
*9: Nipseal VN 3 AQ (trademark, product of Nippon Silica Co.)
*10 Si-69 (trademark, product of Degussa Co.)

When the results of Example 1B and Comparative Example 1B are compared, Example 1B, in which aluminum hydroxide was employed as the powdery inorganic compound, exhibited enhanced labo μ values at 5° C. (low temperature range) and 20° C. (high temperature range) and abrasion resistance although the amount of carbon black and the total amount of carbon black and silica and/or the powdery inorganic compound were common.

The samples of Examples 2B and 3B were prepared by varying the amount of aluminum hydroxide of Example 1B. From the results, it is understood that the labo μ values at 5° C. (low temperature) and 20° C. (high temperature range) were further improved compared to the sample of Example 1B.

When the results of Example 4B and Comparative Example 1B are compared, Example 4B, in which clay was employed as the powdery inorganic compound, exhibited enhanced labo μ values at 5° C. (low temperature range) and 20° C. (high temperature range) and abrasion resistance although the amounts of carbon black and the total amounts were common. Moreover, when the data of Example 4B is compared with Example 1B, in which aluminum hydroxide was used as the powdery inorganic compound, Example 1B exhibited highly enhanced labo μ values at 5° C. (low temperature range) and 20° C. (high temperature range). This reveals that aluminum hydroxide is more preferable than clay as the powdery inorganic compound.

The samples of Examples 5B and 6B contained a $C_9$ aromatic petroleum resin. When they are compared with Comparative Example 1B, in which the amount of carbon black and the total amount were common, it is understood that the labo I.L values at 5° C. (low temperature range) and 20° C. (high temperature range) and abrasion resistance were improved. Moreover, comparison of Example 1B versus Examples 5B and 6B reveals that the samples of Examples 5B and 6B, which contained a $C_9$ aromatic petroleum resin, exhibited a greater improvement in the labo μ value at 20° C. (high temperature) than Example 1B although in these examples, the amount of carbon black, that of the powdery inorganic compound and that of silica were common.

The sample of Example 7B contained an alkyl phenol resin. When the results of this example are compared with those of Comparative Example 1B, in which the amount of carbon black and the total amount were common to those of Example 7B, it is found that the labo μ values at 5° C. (low temperature) and 20° C. (high temperature range) and abrasion resistance were improved. Especially, the labo μ value at 20° C. (high temperature range) as remarkably improved.

Example 8B was different from other examples in that it did not contain a silane coupling agent. When the results of Example 8B are compared to those of Example 1B, in which the amount of carbon black, that of powdery inorganic compound, and that of silica were identical to those of Example 8B, it is found that the labo μ value at 20° C. (high temperature range) and abrasion resistance decreased. However, when the results of Example 8B are compared to those of Comparative Example 1B, in which the amount of carbon black and the total amount were identical to those of Example 8B, it is found that the labo μ values at 5° C. (low temperature range) and 20° C. (high temperature range) were improved although the abrasion resistance stayed almost the same. From these results, it is understood that use of a silane coupling agent is more preferable.

However, comparison between Examples 9B and 6B shows that if a resin is used, similar effects can be obtained regardless of the absence of a silane coupling agent.

As described above, the rubber compositions for tire treads according to the first and second aspects of the present invention remarkably improve the gripping power on wet and semi-wet road surfaces which are not only in a low temperature range but also in a high temperature range, without impeding the abrasion resistance.

What is claimed is:
1. A rubber composition for tire tread comprising a rubber component containing at least 70 parts by weight of a styrene-butadiene rubber whose styrene content is 20 to 60%; and comprising, based on 100 parts by weight of the rubber component,
5 to 150 parts by weight of a powdery inorganic compound represented by the following formula (I) and having a particle size from 0.01 to 10 μm:

$$mM^1 \cdot xSiO_y \cdot zH_2O \tag{I}$$

in which $M^1$ is at least one metal selected from the group consisting of Ti and Ca; any oxide of any one of the metals; or any hydroxide of any one of the metals, and m, x, y, and z are integers from 1 to 5, 0 to 10, 2 to 5, and 0 to 10, respectively, or $M^1$ is at least one metal selected from the group consisting of Al and Mg; any oxide of any one of the metals; or any hydroxide of any one of the metals; and m, x, y, and z are integers from 1 to 5, 0, 2 to 5, and 0 to 10, respectively, and 5 to 170 parts by weight of carbon black having a nitrogen adsorption specific area of 80 to 280 m²/g so that the total amount of the powdery inorganic compound and the carbon black falls in the range of 70 to 200 parts by weight, wherein the amount of an extract obtained when extracting the rubber composition, after being vulcanized, with acetone and chloroform is 30 to 270 parts by weight, based on 100 parts by weight of the rubber component.

2. The rubber composition for tire treads according to claim 1, wherein the powdery inorganic compound of formula (I) is selected from the group consisting of aluminum hydroxide (Al(OH)$_3$), magnesium hydroxide (Mg(OH)$_2$), and calcium hydroxide (Ca(OH)$_2$).

3. The rubber composition for tire treads according to claim 2, wherein the powdery inorganic compound of formula (I) is aluminum hydroxide.

4. The rubber composition for tire treads according to claim 1, wherein the carbon black is selected from the group consisting of carbon black N330, carbon black N220, and carbon black N110.

5. The rubber composition for tire treads according to claim 4, wherein the carbon black is carbon black N110.

6. The rubber composition for tire treads according to claim 1, which further comprises 3 to 50 parts by weight of at least one of a C$_9$-aromatic petroleum resin and an alkylphenol resin.

7. The rubber composition for tire treads according to claim 6, wherein the C$_9$ aromatic petroleum resin is a polymer formed from one or more monomers selected from the group consisting of vinyl toluenes, α-methylstyrenes, coumarones, and indenes, and the alkyl phenol resin is one or more members selected from the group consisting of alkylphenol-acetylene resins and alkylphenol-formaldehyde resins.

8. The rubber composition for tire treads according to claim 6, wherein the softening point of the C$_9$ aromatic petroleum resin and the alkyl phenol resin is from 60 to 150° C.

9. A rubber composition for tire treads comprising a rubber component containing at least 70 parts by weight of a styrene-butadiene rubber whose styrene content is 30 to 45%; and comprising, based on 100 parts by weight of the rubber component, 15 to 120 parts by weight of a powdery inorganic compound represented by the following formula (I) and having a particle size from 0.05 to 5 μm:

$$mM^1 \cdot xSiOy \cdot zH_2O \qquad (I)$$

in which M$^1$ is at least one metal selected from the group consisting of Ti and Ca; any oxide of any one of the metals; or any hydroxide of any one of the metals, and m, x, y, and z are integers from 1 to 5, 0 to 10, 2 to 5, and 0 to 10, respectively, or M$^1$ is at least one metal selected from the group consisting of Al and Mg; any oxide of any one of the metals; or any hydroxide of any one of the metals; and m, x, y, and z are integers from 1 to 5, 0, 2 to 5, and 0 to 10, respectively, and 15 to 140 parts by weight of carbon black having a nitrogen adsorption specific area of 80 to 280 m²/g so that the total amount of the powdery inorganic compound and the carbon black falls in the range of 70 to 200 parts by weight, 5 to 40 parts by weight of at least one of a C$_9$ aromatic petroleum resin and an alkylphenol resin, wherein the amount of an extract obtained when extracting the rubber composition, after being vulcanized, with acetone and chloroform is 30 to 270 parts by weight, based on 100 parts by weight of the rubber component.

10. A rubber composition for tire treads comprising a rubber component containing at least 70 parts by weight of a styrene-butadiene rubber whose styrene content is 20 to 60%; and comprising, based on 100 parts by weight of the rubber component, 5 to 150 parts by weight of a powdery inorganic compound represented by the following formula (1) and having a particle size from 0.01 to 10 μm:

$$mM^1 \cdot xSiOy \cdot zH_2O \qquad (I)$$

in which M$^1$ is at least one metal selected from the group consisting of Ti and Ca; any oxide of any one of the metals; or any hydroxide of any one of the metals, and m, x, y, and z are integers from 1 to 5, 0 to 10, 2 to 5, and 0 to 10, respectively, or M$^1$ is at least one metal selected from the group consisting of Al and Mg; any oxide of any one of the metals; or any hydroxide of any one of the metals; and m, x, y, and z are integers from 1 to 5, 0, 2 to 5, and 0 to 10, respectively, and 5 to 100 parts by weight of silica having a nitrogen adsorption specific area of 130 to 280 m²/g, and 5 to 170 parts by weight of carbon black having a nitrogen adsorption specific area of 80 to 280 m²/g so that the total amount of the powdery inorganic compound and the silica falls in the range of 80 to 250 parts by weight, wherein the amount of an extract obtained when extracting the rubber composition, after being vulcanized, with acetone and chloroform is 30 to 270 parts by weight, based on 100 parts by weight of the rubber component.

11. The rubber composition for tire treads according to claim 10, wherein the powdery inorganic compound of formula (I) is selected from the group consisting of aluminum hydroxide (Al(OH)$_3$), magnesium hydroxide (Mg(OH)$_2$), and calcium hydroxide (Ca(OH)$_2$).

12. The rubber composition for tire treads according to claim 11, wherein the powdery inorganic compound of formula (I) is aluminum hydroxide.

13. The rubber composition for tire treads according to claim 10, wherein the silica is a silicic acid.

14. The rubber composition for tire treads according to claim 10, wherein the carbon black is selected from the group consisting of carbon black N330, carbon black N220, and carbon black N110.

15. The rubber composition for tire treads according to claim 14, wherein the carbon black is carbon black N110.

16. The rubber composition for tire treads according to claim 1, which further comprises a silane coupling agent in an amount of 3 to 20% by weight based on the amount of the silica.

17. The rubber composition for tire treads according to claim 16, wherein the silane coupling agent is a compound represented by the formula Y$_3$—Si—C$_n$H$_{2n}$A, wherein Y is C$_1$–C$_4$ alkyl, alkoxy, or a chlorine atom and three Y's may be the same or different from each other, n is an integer from 1 to 6 inclusive, A is —S$_m$C$_n$H$_{2n}$Si—Y$_3$, nitroso, mercapto, amino, epoxy, vinyl, a chlorine atom, imido, and —S$_m$Z (wherein m is an integer from 1 to 6 inclusive, n and Y are as defined hereinabove, and Z is a group selected from the group consisting of the compounds (A), (B), and (C):

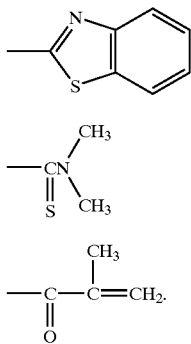

18. The rubber composition for tire treads according to claim 10, which comprises 3 to 50 parts by weight of at least one of a $C_9$ aromatic petroleum resin and an alkylphenol resin.

19. The rubber composition for tire treads according to claim 18, wherein the $C_9$ aromatic petroleum resin is a polymer formed from one or more monomers selected from the group consisting of vinyl toluenes, α-methylstyrenes, coumarones, and indenes, and the alkyl phenol resin is one or more members selected from the group consisting of alkylphenol-acetylene resins and alkylphenol-formaldehyde resins.

20. A rubber composition for tire treads comprising a rubber component containing at least 70 parts by weight of a styrene-butadiene rubber whose styrene content is 30 to 45%; and comprising, based on 100 parts by weight of the rubber component, 15 to 120 parts by weight of a powdery inorganic compound represented by the following formula (I) having a particle size from 0.05 to 5 μm:

$$mM^1 \cdot xSiOy \cdot zH_2O \qquad (I)$$

in which $M^1$ is at least one metal selected from the group consisting of Ti and Ca;

any oxide of any one of the metals; or any hydroxide of any one of the metals, and m, x, y, and z are integers from 1 to 5, 0 to 10, 2 to 5, and 0 to 10, respectively, or $M^1$ is at least one metal selected from the group consisting of Al and Mg; any oxide of any one of the metals; or any hydroxide of any one of the metals; and m, x, y, and z are integers from 1 to 5, 0, 2 to 5, and 0 to 10, respectively, and 30 to 100 parts by weight of silica having a nitrogen adsorption specific area of 130 to 280 $m^2/g$, 15 to 140 parts by weight of carbon black having a nitrogen adsorption specific area of 80 to 280 $m^2/g$ so that the total amount of the powdery inorganic compound and the silica falls in the range of 100 to 230 parts by weight, 5 to 40 parts by weight of at least one of a $C_9$-aromatic petroleum resin and an alkylphenol resin, and, based on the amount by weight of the silica, 3 to 20 percents by weight of a silane coupling agent, wherein the amount of an extract obtained when extracting the rubber composition, after being vulcanized, with acetone and chloroform is 30 to 200 parts by weight, based on 100 parts by weight of the rubber component.

21. The rubber composition for tire treads according to claim 9, wherein the powdery inorganic compound of formula (I) is selected from the group consisting of aluminum hydroxide ($Al(OH)_3$), magnesium hydroxide ($Mg(OH)_2$), and calcium hydroxide ($Ca(OH)_2$).

22. By The rubber composition for tire treads according to claim 20, wherein the powdery inorganic compound of formula (I) is selected from the group consisting of aluminum hydroxide ($Al(OH)_3$), magnesium hydroxide ($Mg(OH)_2$), and calcium hydroxide ($Ca(OH)_2$).

23. The rubber composition for tire treads according to claim 1, which further comprises sulfur.

24. The rubber composition for tire treads according to claim 9, which further comprises sulfur.

25. The rubber composition for tire treads according to claim 10, which further comprises sulfur.

26. The rubber composition for tire treads according to claim 11, which further comprises sulfur.

* * * * *